US008851486B2

(12) United States Patent
Albert et al.

(10) Patent No.: US 8,851,486 B2
(45) Date of Patent: Oct. 7, 2014

(54) UTILITY CART FRAME ASSEMBLY AND UNDERCARRIAGE INTERFACE

(71) Applicant: Ames True Temper, Inc., Camp Hill, PA (US)

(72) Inventors: Barry Albert, Dillsburg, PA (US); Joshua O. Mullen, Duncannon, PA (US)

(73) Assignee: The Ames Companies, Inc., Camp Hill, PA (US)

( * ) Notice: Subject to any disclaimer, the term of this patent is extended or adjusted under 35 U.S.C. 154(b) by 141 days.

(21) Appl. No.: 13/711,721

(22) Filed: Dec. 12, 2012

(65) Prior Publication Data

US 2013/0207361 A1 Aug. 15, 2013

Related U.S. Application Data

(63) Continuation-in-part of application No. 29/413,302, filed on Feb. 14, 2012, now Pat. No. Des. 675,804.

(51) Int. Cl.
*B62B 1/18* (2006.01)

(52) U.S. Cl.
CPC ........................................ *B62B 1/18* (2013.01)
USPC .................................... 280/47.26; 280/47.31

(58) Field of Classification Search
CPC ........ B62B 1/18; B62B 1/206; B62B 2301/05
USPC ............................................ 280/47.26, 47.31
See application file for complete search history.

(56) References Cited

U.S. PATENT DOCUMENTS

| 888,216 | A | * | 5/1908 | Baker | 280/47.31 |
|---|---|---|---|---|---|
| 917,414 | A | * | 4/1909 | Cooper | 280/47.33 |
| 1,815,244 | A | * | 7/1931 | Dodge | 280/47.26 |
| 2,221,834 | A | * | 11/1940 | Garlinghouse | 280/47.31 |
| 4,767,128 | A | * | 8/1988 | Terhune | 280/47.2 |
| 4,955,625 | A | * | 9/1990 | Herndon | 280/47.31 |
| 4,962,833 | A | * | 10/1990 | McCurdy | 188/2 R |
| 5,372,376 | A | * | 12/1994 | Pharaoh | 280/653 |
| 5,489,000 | A | * | 2/1996 | Hillbohm | 180/19.1 |
| 6,991,251 | B2 | * | 1/2006 | Tomchak et al. | 280/653 |
| 7,147,234 | B2 | * | 12/2006 | Davis | 280/47.31 |
| 7,900,939 | B2 | * | 3/2011 | Robinson | 280/47.31 |
| D638,192 | S | | 5/2011 | Hatcher et al. | |
| 7,934,728 | B2 | * | 5/2011 | Strobel | 280/47.21 |
| D646,042 | S | | 9/2011 | Hatcher et al. | |
| 8,567,797 | B2 | * | 10/2013 | Westphal | 280/47.31 |
| 2002/0113388 | A1 | * | 8/2002 | Robinson | 280/47.31 |
| 2002/0113389 | A1 | * | 8/2002 | Robinson | 280/47.31 |
| 2005/0258007 | A1 | * | 11/2005 | Albert | 188/2 D |
| 2005/0275176 | A1 | * | 12/2005 | Jessop | 280/47.31 |
| 2009/0058047 | A1 | * | 3/2009 | Brosh et al. | 280/653 |

(Continued)

FOREIGN PATENT DOCUMENTS

FR 2486893 A * 1/1982

*Primary Examiner* — Katy M Ebner
(74) *Attorney, Agent, or Firm* — Eckert Seamans Cherin & Mellott, LLC; David C. Jenkins (57) ABSTRACT

A utility cart frame assembly is provided. The frame assembly includes a handle assembly cross brace member and a wheel assembly with an axle. The cross brace member and the axle are coupled to, and are immediately adjacent, the tray. In this configuration, the handle assembly cross brace member and the axle provide support to the tray.

4 Claims, 6 Drawing Sheets

(56) References Cited

U.S. PATENT DOCUMENTS

2011/0221147 A1* 9/2011 Hatcher et al. ............ 280/47.31
2012/0049473 A1* 3/2012 Robinson ................... 280/47.31
2012/0091674 A1* 4/2012 Kartalopoulos ........... 280/47.26

* cited by examiner

UTILITY CART FRAME ASSEMBLY AND UNDERCARRIAGE INTERFACE

CROSS REFERENCE TO RELATED APPLICATION

This application is a continuation-in-part of U.S. Design patent application Ser. No. 29/413,302, filed Feb. 14, 2012 entitled TRAY.

BACKGROUND OF THE INVENTION

1. Field of the Invention

The disclosed and claimed concept relates to a utility cart and, more specifically, to a utility cart having a frame assembly and an undercarriage interface structured to stiffen the tray.

2. Background Information

Utility carts, wheelbarrows, and wagons are typically used to transport loads in a tray. While each of these devices serve a similar function, each device has a different principle of operation. Utility carts are structured to transport relatively light loads and maintain a low center of gravity. Further, utility carts typically have two wheels disposed on either side of the tray and which are in a fixed orientation relative to the longitudinal axis of the cart. Wheelbarrows are structured to transport relatively heavy loads and maintain a high center of gravity. That is, a wheelbarrow tray is disposed generally above a relatively tall frame assembly. Further, wheelbarrow, typically have a single wheel disposed near the front end in a yoke formed by two handle members. Due to the number of wheels on either a utility cart or a wheelbarrow, the user must lift a portion of the frame assembly off the ground for movement. Thus, the user supports a portion of the load during transport. Because of this, utility carts and wheelbarrows are used for transporting loads a relatively short distance.

Wagons are structured to transport loads longer distances. To this end, wagons have four wheels that support the load during transport. Further, at least two of the wheels are steering wheels that are structured to pivot about a vertical axis. An elongated handle, often having a loop at the distal end, is typically coupled to the steering wheels. Further, while the wheels may be coupled directly to the tray, the typical wagon includes a relatively short frame assembly that is disposed under the tray.

Given the different tasks these devices are used for, the frame assemblies of each type of device also have different principles of operation. As noted, wagons have a low frame assembly with steerable wheels. Wheelbarrows have an elongated split frame assembly with two generally straight handle members. A wheelbarrow tray is disposed above the handle members. As is known, the handle members typically extend downwardly toward the front of the wheelbarrow. In this configuration, the back ends of the handle members, where the user holds the handles, generally do not extend above the tray. That is, in this configuration, the handles do not need to extend upwardly for a user to comfortably utilize the handles. Conversely, a utility cart frame assembly is not typically elongated in a longitudinal direction. Further, with a utility cart tray disposed closer to the ground, a utility cart frame assembly includes a handle assembly that extends upwardly above the tray. That is, because a utility cart tray is disposed close to the ground and because the handles are not elongated in a longitudinal direction, the handle assembly must extend upwardly for a user to comfortably utilize the handle.

Such a utility cart frame assembly, and more specifically the handle assembly, have disadvantages. Utility cart handle assemblies typically include two support members, disposed in a spaced relation, extending upwardly from the tray. The two support members are coupled by a laterally extending, handle member. In this configuration, the handle assembly and the tray form a loop. Such loop-like handles prevent the user from accessing the tray from the rearward side. That is, unlike a Wheelbarrow wherein the user may position themselves between the split handle, the user of a utility cart must step around the loop-like handle to access the tray. Further, in this configuration, the handle member, which acts as to cross-brace member for the frame assembly is spaced from the tray. Thus, the handle member does not directly brace the tray.

The laterally extending handle member of a utility cart does, however, provide a grip that may be used as a carrying grip as well as a lifting grip. That is, the laterally extending handle member may be used comfortably, and ergonomically, while transporting a load as well as tilting the tray forward to dump a load. Split handle assemblies with straight handle members, such as on a typical wheelbarrow, may be used to comfortably, and ergonomically, transport a load, but are not shaped or positioned for comfort, or ergonomics, while lifting the handle to dump a load. This disadvantage may be addressed by providing the utility cart handles with a carrying grip and a separate lifting grip. Each grip is angled differently. The carrying grip is structured to be used during, transport of the utility cart while the lifting grip is structured to be used while lifting the handle to dump a load.

Further, a wheelbarrow frame assembly typically does not provide direct support to the tray sidewall. That is, the frame assembly typically supports the tray from the bottom. Some wheelbarrow frame assemblies, however, include a brace for the front portion of the tray sidewall. Conversely, a utility cart frame assembly typically is fixed and/or directly coupled to the rear portion of the tray sidewall.

Further, a utility cart frame assembly typically positions the axle for the wheels at a location that is spaced from, and below, the tray. This is a disadvantage as the axle is a rigid member that could be used to stiffen the tray as well.

There is, therefore, a need for a utility cart frame assembly and handle assembly that allows a user to access the tray from the rearward side and braces the tray. There is a further need for a utility cart frame assembly and handle assembly that may be used comfortably and ergonomically during carrying and lifting operations.

SUMMARY OF THE INVENTION

These needs, and others, are met by at least one embodiment of this invention which provides for a utility cart frame assembly wherein a handle assembly cross brace member and the axle are coupled to, and are immediately adjacent, the tray. In this configuration, the handle assembly cross brace member and the axle provide support to the tray. Further, the handle assembly is a split cart handle assembly. Further, the undercarriage interface between the tray and the frame assembly includes a plurality of ribs, wherein two of said plurality of ribs define an axle channel. The axle is disposed in the axle channel and adds rigidity to the tray.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional terms, such as, but not limited to, "forward," "back," "right," "left," "upper," "lower," and "lateral" correspond to the orientation of the utility cart from the perspective of a user standing at the handle portion looking toward the tray; that is, the normal position a user would occupy to move the utility cart. Such directional terms are not limiting upon the claims.

As used herein, the singular form of "a," "an," and "the" include plural references unless the context clearly dictates otherwise. Further, as used herein, the phrase "a number" or variations thereof means one or an integer greater than one.

As used herein, "coupled" means a link between two or more elements, whether direct or indirect, so long as a link occurs.

As used herein "directly coupled" means that two elements are directly in contact with each other.

As used herein, "fixedly coupled" or "fixed" means that two components are coupled so as to move as one while maintaining a constant orientation relative to each other.

As used herein, "correspond" indicates that two structural components are sized and shaped to engage each other with a minimum amount of friction or to generally fit together. For example, an opening which corresponds to a member is sized slightly larger than the member so that the member may pass through the opening with a minimum amount of friction.

As used herein, the word "unitary" means a component is created as a single piece or unit. That is, a component that includes pieces that are created separately and then coupled together as a unit is not a "unitary" component or body.

As used herein a "handle" is an element that is generally structured to be grasped by a user and not an element that is merely capable of being grasped. For example, a wheelbarrow frame assembly may have a plurality of elongated members that may be grasped, but only the handles are structured, i.e. positioned and sized, to be grasped by the user while moving the wheelbarrow.

As used herein, a "grip" is the portion of a handle structured to be gripped by a user. A "grip" includes a portion of a handle having a sufficient, substantially straight length of handle to accommodate the width of four fingers, and may also include a textured surface on the handle and/or a padded portion of the handle. A "grip" must, however, be distinguishable from other portions of the handle. For example, a smooth, straight broomstick is a handle without an identifiable grip because no portion of the handle is different than any other portion. Further, an arcuate portion of a wheelbarrow handle is not a "grip" as no portion of the arcuate portion of the handle is substantially straight.

As used herein, a "split handle assembly" for a cart having a tray is a handle assembly wherein the ends of two handles distal to the tray do not include a cross member.

As used herein, a "wheelbarrow handle assembly" includes two generally straight handle members that extend under a tray and typically form a yoke for a wheel. More specifically, in a "wheelbarrow handle assembly" the handle members do not directly support the rear portion of the tray sidewall. Conversely, as used herein, a "cart handle assembly" includes an assembly having handle members directly coupled to, or unitary with, either the rear portion of the tray sidewall or the lateral sidewalls of the tray adjacent the rear portion of the tray.

As used herein, a "split cart handle assembly" includes a handle assembly wherein the ends of the handle members distal to the tray do not include a cross member and wherein the handle members are directly coupled to, or unitary with, either the rear portion of the tray sidewall or the lateral sidewalls of the tray adjacent the rear portion of the tray.

As used herein, "directly supports" means that a brace, or similar construct, is directly coupled to the element identified as being supported. For example, a wheelbarrow frame assembly typically includes a brace between two leg members that are each coupled to a handle member. In this configuration, the brace "directly supports" the leg members but does not "directly support" the handle members.

As used herein, a "contact surface" is a surface that contacts another element. Thus, as used herein, a surface that is merely capable of contacting another element is not a "contact surface." Further, a member having a generally circular cross-section may have, as used herein, an "arcuate contact surface." That is, as used herein, an "arcuate contact surface" is a surface of a circular element that contacts another element with the contact extending over an arc. Thus, as used herein, an arcuate surface that is merely capable of contacting another element is not an "arcuate contact surface."

Figure 1:
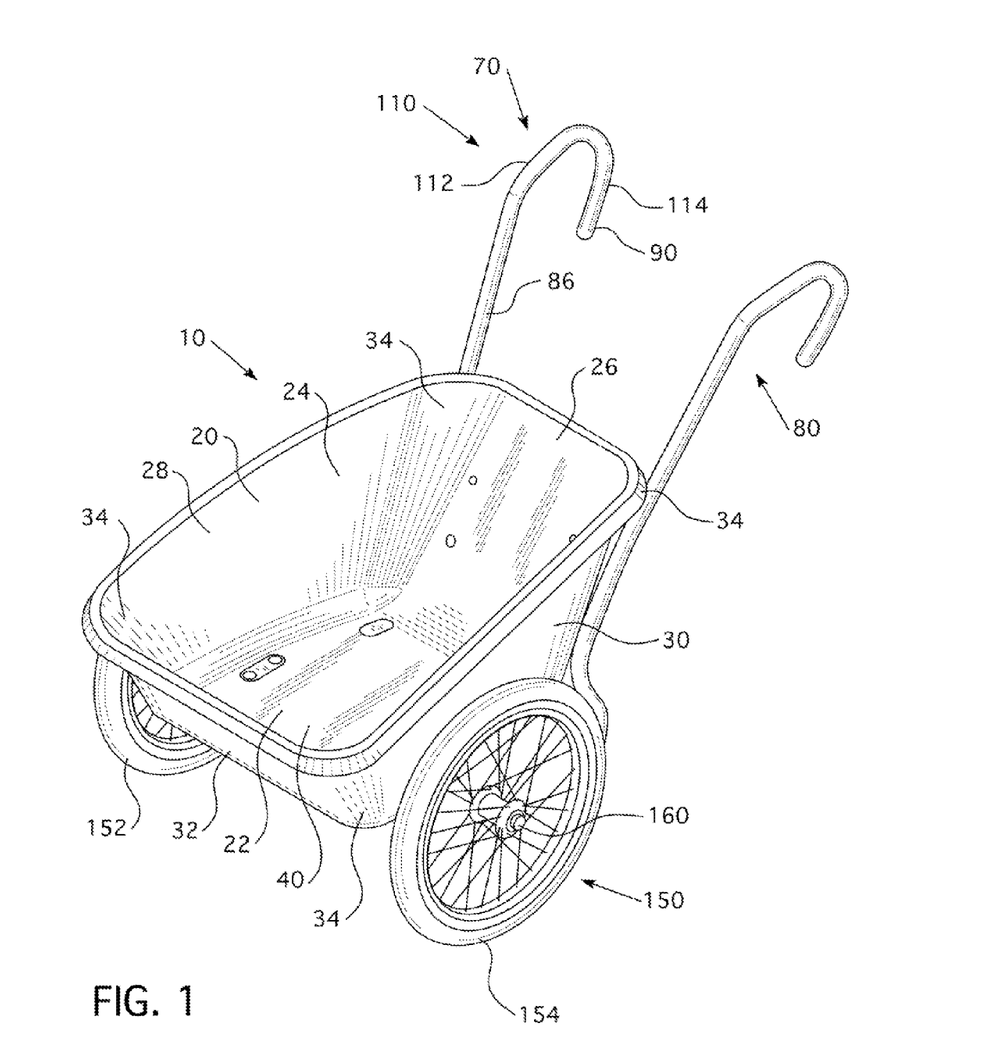
FIG. 1 is an isometric view of a utility cart.
Figure 2:
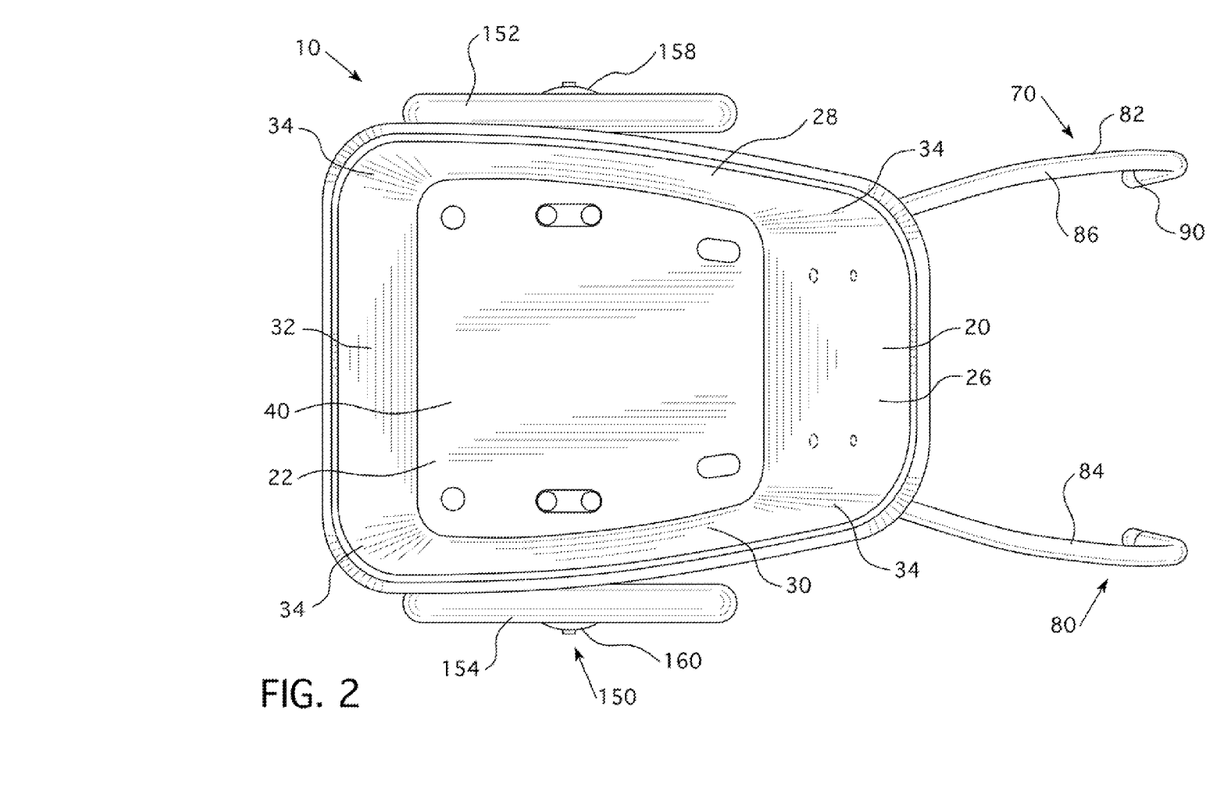
FIG. 2 is a top view of a utility cart.

As shown in FIGS. 1 and 2, a utility cart 10 includes a tray 20, as frame assembly 70, and a wheel assembly 150. The tray 20 is a generally thin walled body that in an exemplary embodiment, is made from a steel or thermoplastic resin. The tray 20 includes a base member 22 and a depending sidewall 24. The tray base member 22 is, in an exemplary embodiment, generally planar. The plane of the tray base member 22 is a generally horizontal plane. The tray base member 22 is, in an exemplary embodiment, generally rectangular, in another exemplary embodiment, the tray base member 22 is generally trapezoidal with the front side being slightly longer than the rear side. The tray sidewall 24 is an ascending dependent sidewall that may be flared outwardly. Portions of the tray sidewall 24, i.e. the rear portion 26, the right and left side portions 28, 30, and the front portion 32, are each generally planar. The tray sidewall 24 further includes transition portions 34 between each of the adjacent rear, right, left and front portions 26, 28, 30, 32.

Figure 3:
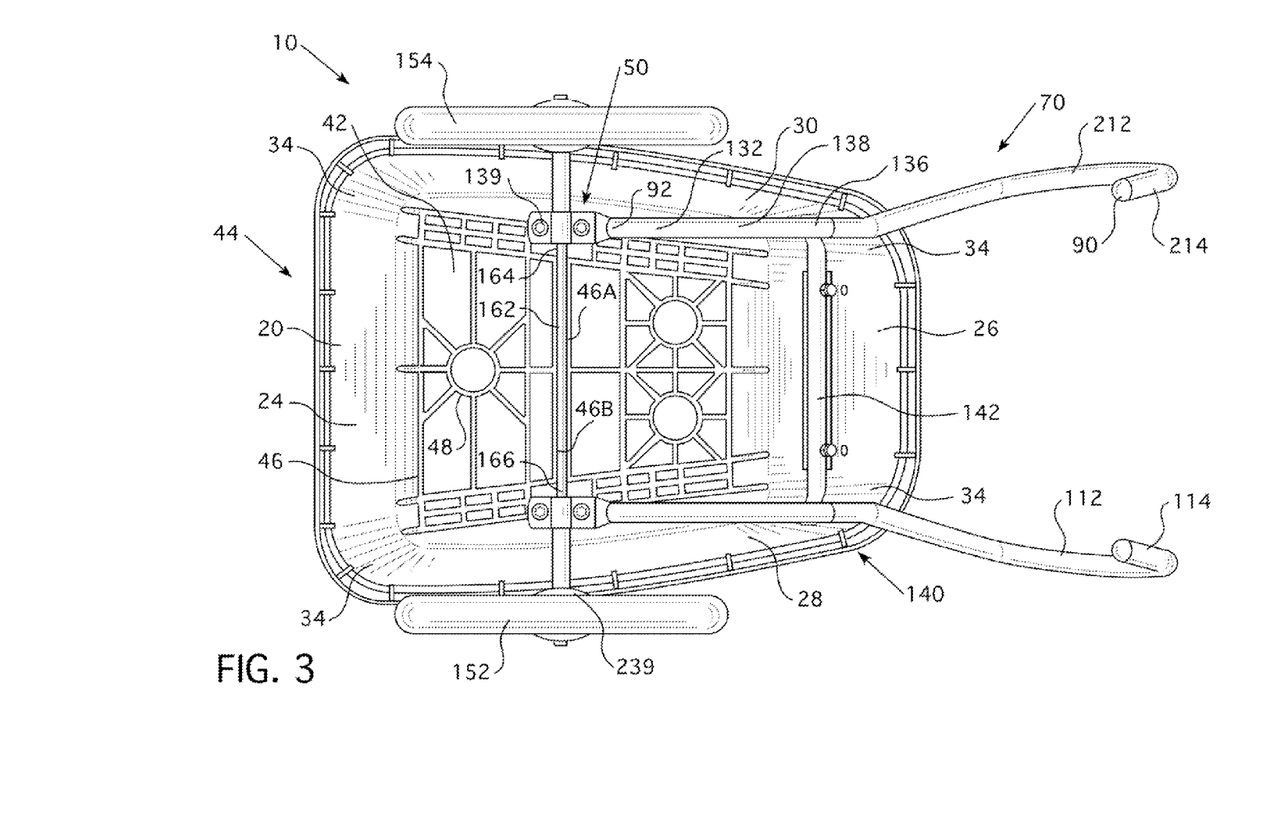
FIG. 3 is a bottom view of a utility cart.

The tray base member 22 includes an upper side 40 and a lower side 42 (FIG. 3). The tray base member lower side 42 includes a plurality of ribs 44. Each rib 44 is a thin wall member extending from the tray base member lower side 42. As shown, ribs 44 include, but are not limited, to, planar ribs 46 and tubular ribs 48. The plane of each planar rib 46 and the axis of each tubular rib 48 extends generally perpendicular to the plane of the tray base member 22. Two planar ribs 46A, 46B extend generally laterally across the tray base member lower side 42. These two planar ribs 46A, 46B define an axle channel 50. These two planar ribs 46A, 46B, hereinafter "axle channel ribs 46A, 46B," are disposed in a spaced relation. The distance between the axle channel ribs 46A, 46B corresponds to the diameter of the axle body 162, discussed below. The axle channel 50 is disposed below and immediately adjacent the tray base member lower side 42. Further, in one embodiment, the tray base member lower side 42 between the axle channel ribs 46A, 46B is concave and sized to correspond to the axle body 162. It is understood that, "sized to correspond to the axle body 162" means sized and shaped to have a corresponding spacing to that portion of the axle body 162 disposed in the axle channel 50. In an exemplary embodiment, the axle body 162 is 25% to 100% disposed in the axle channel 50. That is, a small portion of, or the entire upper portion of, the axle body 162 is disposed in the axle channel 50. In an exemplary embodiment, about 50% of the axle body 162, i.e. about the upper half of the axle body 162, is disposed in the axle channel 50.

Figure 4:
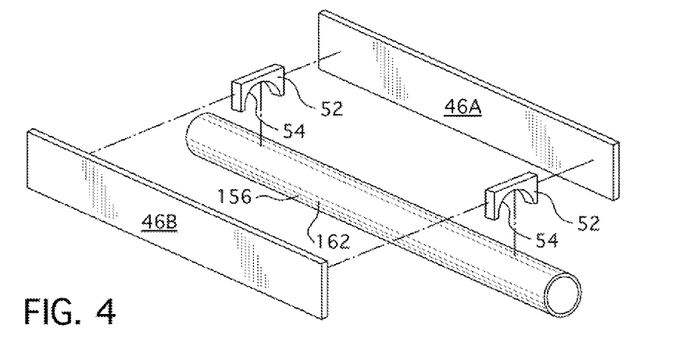
FIG. 4 is a detail view of an axle channel.

In another embodiment, shown in FIG. 4, the axle channel 50 includes a number of axle support ribs 52. The axle support ribs 52 are generally planar. The axle support ribs 52 further extend generally perpendicular to the axis of the axle channel 50. That is, the plane of the axle support ribs 52 extend generally longitudinally. The axle support ribs 52 each have a lower side 54. Each axle support rib lower side 54 is, in an exemplary embodiment, shaped to correspond to the diameter of the axle body 162. That is, each axle support rib lower side 54 is concave. In this embodiment, the depth of the axle channel 50 (i.e., the vertical length of the axle channel ribs 46A, 46B) is increased to accommodate the axle support ribs 52 while still allowing between about 25% to 100%, and more preferably about 50%, of the axle body 162 to be disposed in the axle channel 50.

Figure 5:
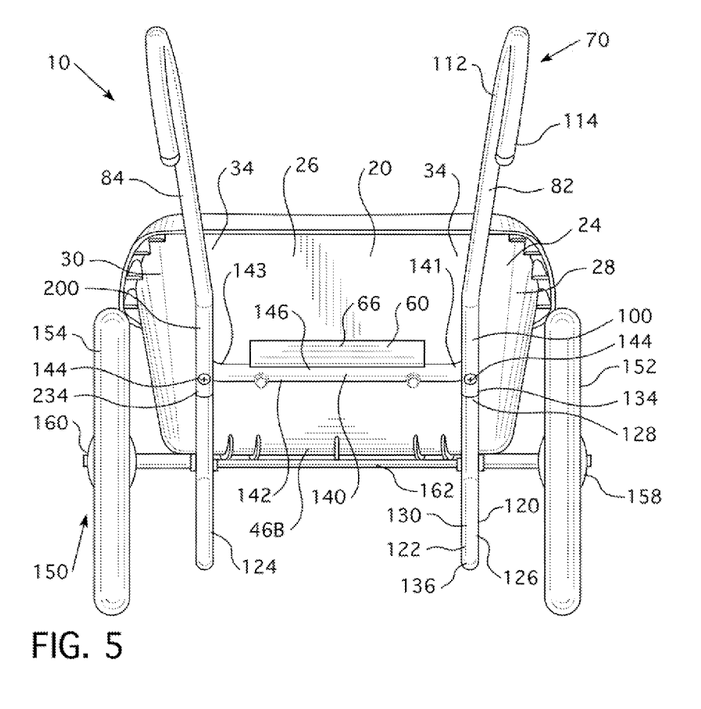
FIG. 5 is a rear view of a utility cart.
Figure 6:
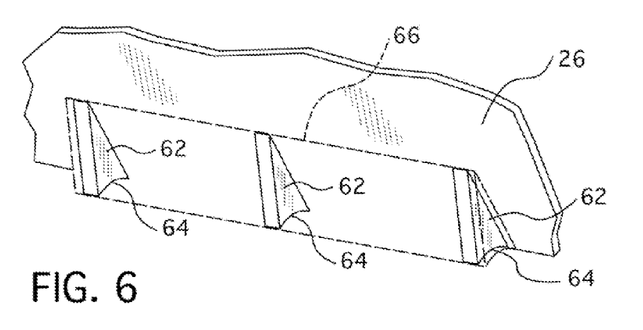
FIG. 6 is a detail view of a gusset assembly.

The tray sidewall rear portion 26 includes a gusset assembly 60 having a number of gussets 62, as shown in FIGS. 5 and 6. Each gusset 62 is, in an exemplary embodiment, a planar member wherein the plane of each gusset 62 is disposed both generally vertically and generally longitudinally. In one embodiment, each gusset 62 is generally triangular having a lower side 64. Each gusset lower side 64 is sized to correspond to the cross-brace member 142, discussed below. In an exemplary embodiment, discussed below, the cross-brace member 142 is a circular tube and the each gusset lower side 64 is generally concave and arcuate. That is, each gusset lower side 64 is sized to generally correspond to the shape of the cross-brace member 142. The gussets 62 are disposed so as to be generally aligned along a generally horizontal line. The gusset assembly 60 may include a cover member 66. The gusset assembly cover member 66 extends over the rearward and/or upper surface of the gussets 62.

Figure 7:
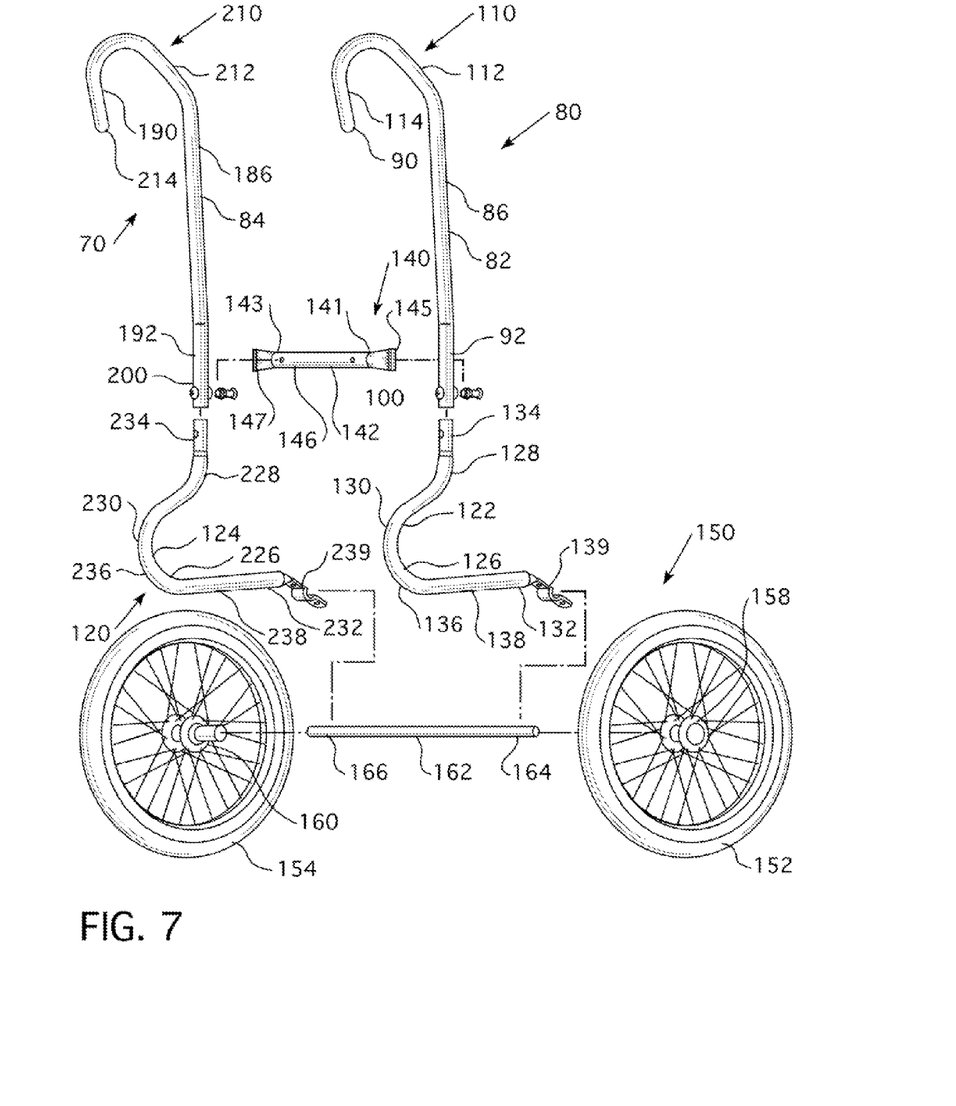
FIG. 7 is an exploded view of a frame assembly.

The frame assembly 70 includes a split cart handle assembly 80, a leg assembly 120, and a cross brace assembly 140, as shown in FIG. 7. In one embodiment, the frame assembly members, identified below, are hollow, tubular members. The split cart handle assembly 80 includes a first handle member 82 and a second handle member 84. The first and second handle members 82, 84 are substantially similar so only one will be described below. It is understood that the description of the first handle member 82 is applicable to the second handle member 84 as well. When discussed below, reference numbers for the second handle member 64 shall be 100+the reference number for the first handle member 82. The first handle member 82 is, in an exemplary embodiment, a hollow tubular body 86 having a generally circular cross-section. The first handle member tubular body 86 includes a distal end 90 and a proximal end 92; the first handle member proximal end 92 is disposed adjacent the tray 20, as described below, and the first handle member distal end 90 is disposed distal to the tray 20.

The first handle member proximal end 92 is an interface end 100. The first handle member tubular body interface end 100 is structured to be coupled to another tubular member, and more specifically, to a leg member tubular body 126, discussed below. The first handle member interface end 100 is sized to correspond to the leg member tubular body 126. As shown, the first handle member tubular body interface end 100 has a larger diameter than the leg member tubular body 126. Thus, the leg member tubular body 126 may be disposed partially inside the first handle member interface end 100.

More specifically, the leg member tubular body 126 also includes an interface end 134 and the leg member tubular body interface end 134 is disposed inside the first handle member tubular body interface end 100. The first handle member tubular body interface end 100 and the leg member tubular body interface end 134 overlap, i.e. the leg member tubular body interface end 134 extends within the first handle member tubular body interface end 100, for a length of between about 1.25 and 6.0 inches.

The first handle distal end 90 includes a grip assembly 110. The grip assembly 110 includes a carrying grip 112 and a lifting grip 114. The carrying grip 112 is angled between a downwardly and forwardly 16° tilt to upwardly and forwardly 16° tilt relative to a horizontal line. The lifting grip 114 is angled downwardly and forwardly between about 24° and 56° relative to a horizontal, line. More specifically, the carrying grip 112 is substantially parallel, i.e. 0°, relative to a horizontal line and the lifting grip 114 is angled downwardly and forwardly about 40° relative to a horizontal line. The angles recited in this paragraph assume that the utility cart 10 at rest, i.e. not being, lifted or moved.

The leg assembly 120 includes a first leg member 122 and a second leg member 124. As with the handle assembly 80, the leg members 122, 124 are substantially similar and only one will be described; reference numbers for the second leg member 124 shall be 100+the reference number for the first leg, member 122. The first leg member 122 includes a generally tubular body 126 having a generally circular cross-section. The first leg member tubular body 126 further includes a first end 128, a medial portion 130, and a second end 132. The first leg member tubular body first end 128 includes an interface end 134. As noted above, the first handle member tubular body interface end 100 and first leg member tubular body interface end 134 have a corresponding size and shape and are structured to be coupled to each other. The first leg member tubular body medial portion 130 includes an arcuate portion 136 and a straight portion 138. The first leg member tubular body arcuate portion 136 extends toward the ground and acts as a leg. The first leg member tubular body straight portion 138 extends upwardly from the first leg member tubular body arcuate portion 136 toward the tray base member lower side 42. The first leg member tubular body second end 132, which is disposed at the forward end of the first leg member tubular body straight portion 138, may include a bracket 139 that retains the axle body 162 in the axle channel 50.

Figure 8:
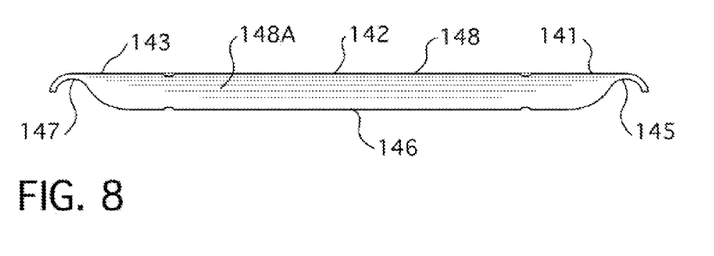
FIG. 8 is a detail view of a cross bar member.

As shown in FIG. 8, the cross brace assembly 140 includes an elongated cross brace member 142 and a number of fasteners 144. The cross brace member 142, in an exemplary embodiment, includes an elongated tubular body 146 having a generally circular cross-section. The cross brace member 142 includes a contact surface 148 extending generally parallel to the longitudinal axis of the cross brace member 142. The cross brace member contact surface 148 extends over substantially the length of the cross brace member 142. The cross brace member contact surface 148 may be an arcuate contact surface 148A. That is, as described below, the cross brace member contact surface 148 is coupled, and in an exemplary embodiment directly coupled, to the tray sidewall rear portion 26 and may be coupled, and in an exemplary embodiment directly coupled, to the gusset assembly 60. When the cross brace member 142 is coupled to the tray sidewall rear portion 26 and to the gusset assembly 60, the cross brace member contact surface 148 is an arcuate contact surface 148A.

Further, the cross brace member 142 includes a first end 141 and a second end 143. The cross brace member first end 141 and the cross brace member second end 143 include flattened end sockets 145, 147, respectively. The cross brace member flattened end sockets 145, 147 are shaped to correspond to the first and second handle member tubular body 86. That is, the cross brace member flattened end sockets 145, 147 are portions of the cross brace member circular tubular body 146 that have been flattened then curved into arcuate sockets 145, 147. In an exemplary embodiment, the center of the arcuate sockets 145, 147 is generally disposed on a line aligned with the longitudinal axis of the cross brace member tubular body 146. In this configuration, and when the diameter of the cross brace member circular tubular body 146 and the first and second handle member tubular body 86 have a similar diameter, the outer side of the arcuate sockets 145, 147 is substantially aligned with the cross brace member contact surface 148.

As shown in FIG. 7, the wheel assembly 150 includes a first wheel 152, a second wheel 154, and an axle 156. The first and second wheels 152, 154 have hubs 158, 160. The axle 156 includes a generally cylindrical body 162 with a first end 164 and a second end 166. The axle body 162 may be fixed to the tray 20 with the first and second wheels 152, 154 rotatably coupled to the axle body 162, or, the axle body 162 may be rotatable coupled to the tray 20. Thus, the first and second wheels 152, 154 are rotatably coupled to the tray 20. In another alternative embodiment, the axle body 162 is rotatable coupled to the tray 20 and the first and second wheel hubs 158, 160 are rotatably coupled to the axle body 162. The first and second wheels 152, 154 are coupled to the axle body first and second ends 164, 166, respectively. The axle body 162 is a rigid body, preferably made from a metal, preferably steel. The axle body 162 has a sufficient length to extend laterally across the tray 20.

Elements of the utility cart 10 is assembled as follows. The first leg member tubular body interface end 134 is coupled to the first handle member tubular body interface end 100. The second leg member tubular body interface end 234 is coupled to the second handle member tubular body interface end 200. As noted above, the first and second handle member tubular body interface ends 100, 200 and the first and second leg member tubular body interface ends 134, 234 overlap. The cross brace member 142 is coupled to the first and second handle members 82, 84 with the first handle member tubular body interface end 100 and the second handle member tubular body interface end 200 being disposed in the cross brace member arcuate sockets 145, 147.

The cross brace member 142 is then coupled, and in an exemplary embodiment directly coupled, to the outer side of the tray sidewall rear portion 26. In this configuration, a substantial length of the cross brace member contact surface 148 is directly coupled to the tray sidewall rear portion 26 and directly supports the tray sidewall rear portion 26. Further, in an exemplary embodiment, the cross brace member 142 is disposed under the gusset assembly 60. That is, the cross brace member 142 is coupled, and in an exemplary embodiment directly coupled, to the gusset assembly 60. The gussets 62, and more specifically each gusset lower side 64, is directly coupled to the cross brace member contact surface 148. Fasteners 144 are then passed through the tray sidewall rear portion 26 and through cross brace member 142. Further, fasteners 144 are also used to coupled the cross brace member 142 to the handle assembly 80 and the leg assembly 120. More specifically, fasteners 144 are passed through each cross brace member arcuate socket 145, 147, the first and second handle member tubular body interface ends 100, 200, and the first and second kg member tubular body interface ends 134, 234. In this configuration, the cross brace member 142 directly supports the tray 20 and provides rigidity thereto.

Further, the axle body 162 is disposed in the axle channel 50. The axle body is coupled, and in an exemplary embodiment directly coupled, to the axle channel 50 and more specifically to the axle support ribs 52. The axle body 162 may be maintained in place by brackets 139, 239. In this configuration, the axle body directly supports the tray base member 22.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A utility cart comprising:
a tray including a base member and a depending sidewall;
a frame assembly including a split cart handle assembly, a leg assembly, and a cross brace assembly;
a wheel assembly including two wheels, said wheels rotatably coupled to said tray;
said split cart handle assembly includes a first handle member and a second handle member;
said cross brace assembly including an elongated cross brace member and a number of fasteners;
said tray sidewall including a rear portion;
said cross brace member disposed adjacent said tray sidewall rear portion and extending between said first handle member and said second handle member; and
said cross brace assembly fastener coupled through said tray sidewall rear portion, said split cart handle assembly, said leg assembly and said cross brace member;
wherein said cross brace member is directly coupled to said tray sidewall rear portion and directly supports said tray sidewall rear portion;
said tray sidewall rear portion includes a gusset assembly having a number of gussets; and
each said tray rear sidewall portion gusset coupled to said cross brace member.

2. The utility cart of claim 1 wherein said gusset assembly includes a plurality of gussets, wherein said gussets are generally aligned along a generally horizontal line.

3. A utility cart comprising:
a tray including a base member and a depending sidewall;
a frame assembly including a split cart handle assembly, a leg assembly, and a cross brace assembly;
a wheel assembly including two wheels, said wheels rotatably coupled to said tray;
said split cart handle assembly includes a first handle member and a second handle member;
said cross brace assembly including an elongated cross brace member and a number of fasteners;
said tray sidewall including a rear portion;
said cross brace member disposed adjacent said tray sidewall rear portion and extending between said first handle member and said second handle member; and
said cross brace assembly fastener coupled through said tray sidewall rear portion, said split cart handle assembly, said leg assembly and said cross brace member;
said first handle member and said second handle member each include a tubular body;
said cross brace member includes a tubular body having a first end and a second end; and
wherein each of said cross brace member body first end and second end include flattened end sockets, said flattened end sockets corresponding to said first handle member tubular body and said second handle member tubular body.

4. The utility cart of claim 3 wherein:

said first handle member tubular body and said second handle member tubular body each have a generally circular cross-section; and wherein each said flattened end sockets are arcuate sockets having a center generally disposed on a line aligned with the longitudinal axis of said cross brace member tubular body.

\* \* \* \* \*

UNITED STATES PATENT AND TRADEMARK OFFICE
CERTIFICATE OF CORRECTION

PATENT NO. : 8,851,486 B2  Page 1 of 1
APPLICATION NO. : 13/711721
DATED : October 7, 2014
INVENTOR(S) : Barry Albert et al.

It is certified that error appears in the above-identified patent and that said Letters Patent is hereby corrected as shown below:

Specification

Column 1, line 29, "wheelbarrow," should read --wheelbarrows--.
Column 2, line 3, "extending," should read --extending--.
Column 2, line 7, "Wheelbarrow" should read --wheelbarrow--.
Column 2, line 10, "as to" should read --as a--.
Column 2, line 25, "during, transport" should read --during transport--.
Column 4, line 29, "as frame" should read --a frame--.
Column 4, line 30, "that in" should read --that is--.
Column 4, line 36, "rectangular, in another" should read --rectangular. In another--.
Column 4, line 50, "limited, to," should read --limited to,--.
Column 5, line 49, "member 64" should read --member 84--.
Column 5, line 49, "100+the" should read --100+ the--.
Column 6, line 16, "horizontal, line" should read --horizontal line--.
Column 6, line 21, "being, lifted" should read --being lifted--.
Column 6, line 26, "100+the" should read --100+ the--.
Column 6, line 27, "leg, member" should read --leg member--.
Column 7, line 67, "second kg member" should read --second leg member--.

Signed and Sealed this
Twenty-seventh Day of October, 2015

Michelle K. Lee
*Director of the United States Patent and Trademark Office*